Patented Mar. 15, 1927.

1,620,938

UNITED STATES PATENT OFFICE.

HARRY P. BASSETT, OF CYNTHIANA, KENTUCKY.

ALTERING VISCOSITY OF CELLULOSE-CONTAINING MATERIALS.

No Drawing.   Application filed December 19, 1923. Serial No. 681,654.

This invention relates to the production of cellulose containing materials including cellulose, nitro-cellulose, denitrated nitro-cellulose, and the like, and has for its principal object to produce cellulose-containing material which will form a solution of a desired degree of viscosity and particularly such solutions of a desired high degree of viscosity.

In the practice of my process, cotton or other cellulose fibre is treated with a weak solution of an acid or an acid salt, preferably a mineral acid, such as sulfuric acid, or a mineral acid salt having a hydrogen ion content equivalent to a solution of sulfuric acid of from .05 per cent to 1 per cent strength by weight at a selected temperature above 20° C. and not materially in excess of 100° C., to hydrolize the gummy constituents of the fibre and form more or less mucilaginous cementing material at the same time, and then washed with water to remove the acid and soluble bodies formed in the hydrolysis. Before or after the acid treatment, the material is treated with a solution of an alkali, preferably a weak solution of sodium hydroxid, to react with the hydrolized gums to form organic salts, washed with water to remove the soluble organic salts, and preferably bleached. The material may consist of cellulose, nitro-cellulose, denitrated nitro-cellulose, or the like, produced from the treated cellulose in any of the well known and approved methods, any intermediate step between the purification of the fibres and effecting a solution thereof, such as nitration, forming no part of the present invention.

I have found that by controlling the strength of the acid liquor and controlling the temperature and time of treatment, a product of a desired viscosity may be obtained. The fibres to be treated, are treated with a weak solution of an alkali, such as sodium hydroxid either before or after the acid treatment.

Although the range of strength of acid liquor used is quite wide, I consider the action to be a product of the hydrogen ion content of the liquor with the temperature employed and the duration of heating. It may be seen, therefore, that the variation of the hydrogen ion content is not necessarily great, as compared with the product of the other two factors. The effectiveness of a range of temperature, even from 20° C. to 100° C., is probably as great as the effectiveness of variation of the hydrogen ion content in the acid, as by varying the strength of a solution of sulfuric acid of say from .10 to 1 per cent.

I have discovered that, in carrying out the steps enumerated, the viscosity of a cellulose containing solution formed from the material, is affected by the strength of the acid used in hydrolizing the gummy constituents of the fibre, and by the temperature at which this hydrolysis is carried out. If, for example, acid having a hydrogen ion content equivalent to a solution of sulfuric acid of from .05 per cent strength by weight is used, a solution formed from the resulting material will have a higher viscosity than if acid of higher strength within the range of from approximately .05 to 1 per cent strength is used. Similarly, in the treatment of the fibre with weak acid of from .05 to 1 per cent strength, the viscosity of a solution of the resulting material will be higher if the hydrolysis is carried out at 80° C., than if carried out at a higher temperature within the range of the 80° to 100° C.

Cellulose containing materials capable of forming solutions of a relatively high viscosity can be obtained by the use of an acid solution of a strength near the lower limit of the range of acid strengths set forth, at a temperature somewhat below 80° C. I can obtain materials capable of forming solutions of a fairly high viscosity by conducting the hydrolysis at a temperature as low as 20° C., but I have obtained the best results in producing solutions of high viscosity from such materials by the use of acid of about .05 per cent acid strength at a temperature of about 80° C.

In producing materials capable of producing solutions of medium viscosity, I may advantageously carry out the hydrolization at a temperature of about 90° C., using acid of a desired strength containing hydrogen equivalent to a solution of sulfuric acid of from .05 to 1 per cent by weight of acid, but as I prefer to hydrolize at about 80° C., where a material capable of forming a solution of low viscosity is not required, I prefer in the production of materials for solutions of medium or relatively high viscosity, to employ an acid of from approximately .25 to 1 per cent strength at a temperature of about 80° C.

In producing materials for forming solutions of low viscosity, I use acid having a hydrogen ion content equivalent to a 1 per cent solution of sulfuric acid at a temperature of about 100° C.

From my experiments, it appears that of the factors affecting the materials, the temperature at which the hydrolysis is conducted is the more important and a considerable range of differences in material is obtainable by merely varying the temperature at which the acid treatment is carried out, but to obtain the widest range of differences in viscosity of solutions formed from such materials, it will be understood that the time of treatment, the temperature within the limits set forth, and the strength of acid within the limits set forth, must be varied in accordance with the invention, the viscosity being correspondingly increased as weaker acid within the range of from .05 to 1 per cent strength is used, as a lower temperature within the range of from 20° C. to 100° C., is employed and as the time of treatment is shortened.

The degree of strength of the solution of alkali employed does not appear to affect the cellulose-containing material. I prefer, however, to employ a solution of approximately from .1 to 2.5 per cent strength by weight of a basic compound of an alkali metal or alkaline earth metal, preferably sodium hydroxid.

In regenerating the alkaline liquor used in the later stages of the treatment, I find that it is possible to reconvert these liquors into sodium hydroxid by boiling with caustic lime. The removal of the carbohydrates made soluble by the acid treatment permits the soda liquor to be regenerated in this highly simplified manner. The waste liquors are heated to a boiling temperature with caustic lime and then filtered or decanted. In the filtering operation, the liquor is clarified, and insoluble, resinous brine compounds are removed. This method of regeneration is highly advantageous over the treatment heretofore used in the recovery of soda in which the "black liquor" is first concentrated by evaporation, then burned in a "black ash" furnace, whereby the alkali is completely carbonated. The ash containing the carbonate alkali is then lixiviated and the solution causticized with lime. I have discovered that it is possible to liberate the free alkali direct with lime, due to the presence of soluble carbohydrates and other bodies, the exact chemical classification of which I am unable to give.

Where the alkali treatment precedes the acid treatment, the process is performed in substantially the same manner. The fibres are first treated with a solution of caustic soda of approximately from .1 to 2.5 per cent strength by weight and then washed or an equivalent solution of another alkali. The resulting material is then treated with an acid solution of from .05 to 1 per cent, the strength of the acid solution being determined by the character of the material to be obtained. The character of the material to be obtained is regulated as in the form of the process where the acid treatment precedes the alkali treatment, and if a higher viscosity is desired, a weaker acid solution is employed, or a lower temperature employed, or the material treated for a shorter length of time. Where a lower viscosity is desired, a stronger acid solution of substantially 1 per cent strength is employed at a temperature of about 100° C., for a longer period of time.

It will, of course, be understood that the acid treatment will be continued until the gummy constituents of the cellulose fibres are completely hydrolyzed and the required amount of mucilaginous material formed as can readily be determined by the examination of a test sample, and that, in the treatment of fibre of a uniform grade, a duration of treatment found by examination to be satisfactory will be followed.

Similarly, the alkali treatment will be continued until the hydrolyzed gums are wholly converted into soluble bodies and the washing operations continued until all soluble bodies are removed.

If the purified fibre is to be bleached, I may employ any of the well known cellulose bleaching treatments, but I prefer to employ a solution of calcium hypochlorite of about .5 per cent strength by weight.

While I have described in detail the preferred practice of my process, it is to be understood that the details of procedure, and proportion of ingredients may be widely varied, and that known chemical equivalents may be employed in place of the materials mentioned without departing from the spirit of the invention or the scope of the subjoined claims.

Having thus described my invention, I claim:

1. The herein described steps in the process of producing a cellulose derivative capable of producing solutions of a desired viscosity comprising treating cellulose fibre with a dilute acid containing a percentage of acid having a hydrogen ion content equivalent to a solution of sulfuric acid between approximately .05 and 1 per cent by weight at a temperature above 20° C., and below 100° C., washing the fibre, treating it with a dilute alkali solution, and washing the fibre.

2. The herein described steps in the process of producing a cellulose derivative capable of producing solutions of a desired viscosity comprising treating cellulose fibre with a dilute acid containing a percentage of acid having a hydrogen ion content equivalent to a solution of sulfuric acid between approximately .05 per cent and 1 per cent at a temperature above 20° C. and not in excess of 100° C., washing the fibre, treating it with a dilute alkali solution, and washing the fibre.

3. The herein described steps in the process of producing a cellulose derivative capable of producing solutions of a desired viscosity comprising treating cellulose fibre with a dilute acid containing a percentage of acid having a hydrogen ion content equivalent to a solution of sulfuric acid between approximately .05 and 1 per cent by weight between approximately 80° and 90° C., washing the fibre, treating it with a dilute alkali solution, and washing the fibre.

4. The herein described steps in the process of producing a cellulose derivative capable of producing solutions of a desired viscosity comprising treating cellulose fibre with a dilute acid containing a percentage of acid having a hydrogen ion content equivalent to a solution of sulfuric acid between approximately .05 and 1 per cent, at a temperature of approximately 80° C., washing the fibre, treating it with a dilute alkali solution, and washing the fibre.

5. The herein described steps in the process of producing a cellulose derivative capable of producing solutions of a desired degree of viscosity comprising treating cellulose fibre with sulfuric acid of approximately .25 per cent strength at a temperature below 100° C., but not below 20° C., washing the fibre, treating it with a dilute alkali solution, and washing the fibre.

6. The herein described steps in the process of producing a cellulose derivative capable of producing solutions of a desired degree of viscosity comprising treating cellulose fibre with sulfuric acid of approximately .25 per cent strength at a temperature of approximately 80° C., washing the fibre, treating it with a dilute alkali solution, and washing the fibre.

In testimony whereof, I affix my signature.

HARRY P. BASSETT.